United States Patent [19]
Suzuki et al.

[11] Patent Number: 5,917,462
[45] Date of Patent: Jun. 29, 1999

[54] DISPLAY APPARATUS

[75] Inventors: Shoji Suzuki; Masayoshi Shimizu, both of Kawasaki, Japan

[73] Assignee: Fujitsu Limited, Kawasaki, Japan

[21] Appl. No.: 08/746,198

[22] Filed: Nov. 6, 1996

[30] Foreign Application Priority Data

May 31, 1996 [JP] Japan ................................. 8-138153

[51] Int. Cl.$^6$ .................................................. G09G 3/00
[52] U.S. Cl. ................................ 345/32; 345/151; 349/9
[58] Field of Search .................................. 345/1, 3, 7, 8, 345/9, 32, 87, 104, 151; 349/5, 8, 9

[56] References Cited

U.S. PATENT DOCUMENTS 5,042,921  8/1991  Sato et al. ................................. 349/9

OTHER PUBLICATIONS

"Super High Information Content Projection Dislay Using an NCPT Liquid Crystal", Mochizuki et al, *Fujitsu Sci. Tech. J.*, 28,3; Sep. 1992, pp. 369–376.
"Liquid–Crystal Video Projector—Brightness Image—Color Image Separation System", NAI et al, *Mitsubishi Denki Giho*, vol. 69, No. 11, 1995, pp. 965–969, with English translation of relevant portions thereof.

*Primary Examiner*—Matthew Luu
*Attorney, Agent, or Firm*—Nikaido, Marmelstein, Murray & Oram LLP

[57] ABSTRACT

A display apparatus having an optical device for separating the light from a light source for projection into two polarized light beams, a first liquid-crystal panel which includes a polarizing plate and to which a first polarized light beam separated by the optical device is input and a second liquid-crystal panel which has no polarizing plate and to which a second polarized light beam separated by the optical device is input, in which a data separating means separates display data into data for the first liquid-crystal panel and data for the second liquid-crystal panel, a first liquid-crystal panel display controller controls the color display of the first liquid-crystal panel in accordance with the separated data for the first liquid-crystal panel, a second liquid-crystal panel display controller controls the monochrome display of the second liquid-crystal panel in accordance with the separated data for the second liquid-crystal panel and an optical system synthesizes the pictures on the first and second liquid-crystal panels and displays the synthesized picture on a screen.

13 Claims, 15 Drawing Sheets

VIDEO SIGNAL

SAMPLING PULSE (3.58MHZ×4)

SAMPLING

QUANTIZATION

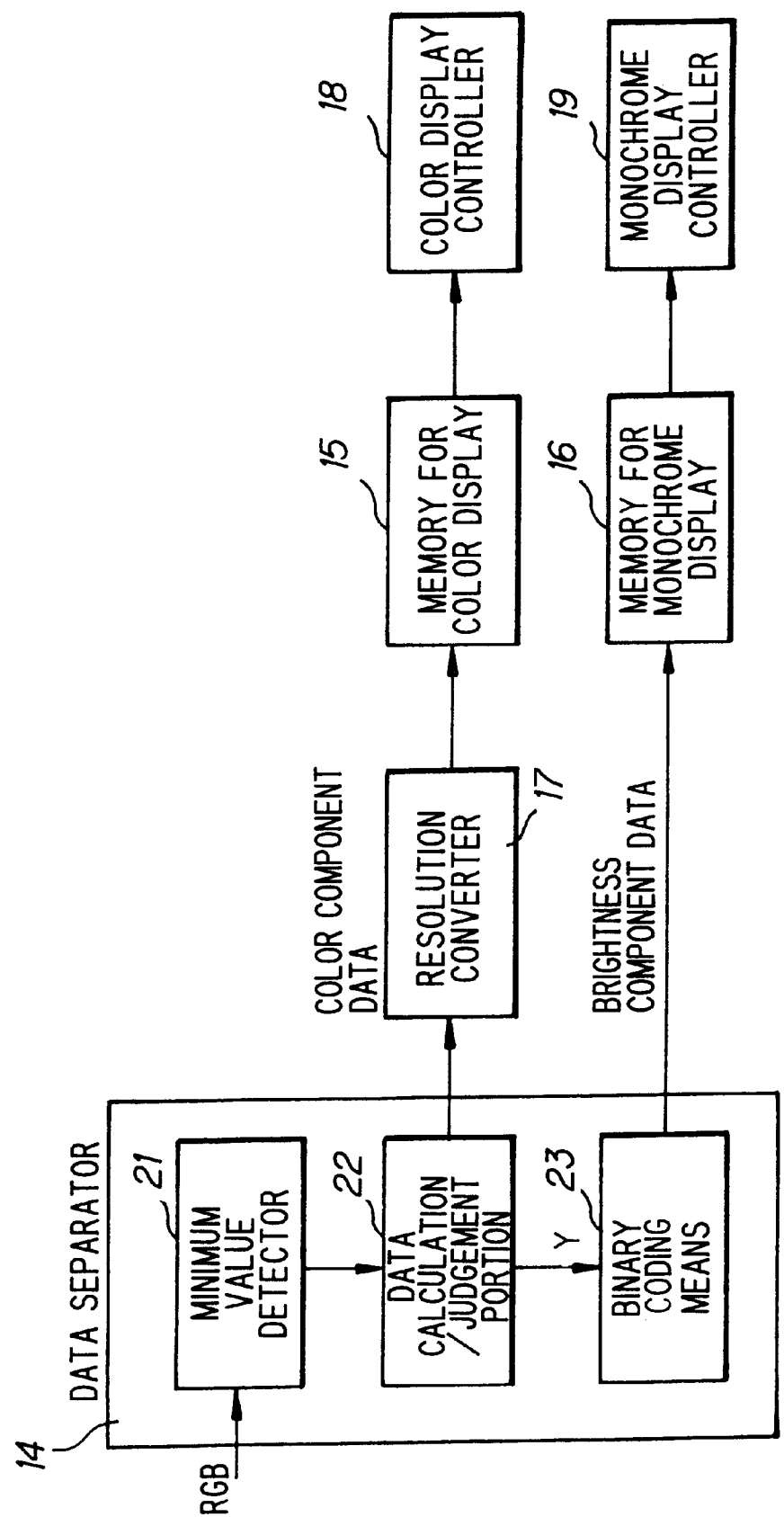

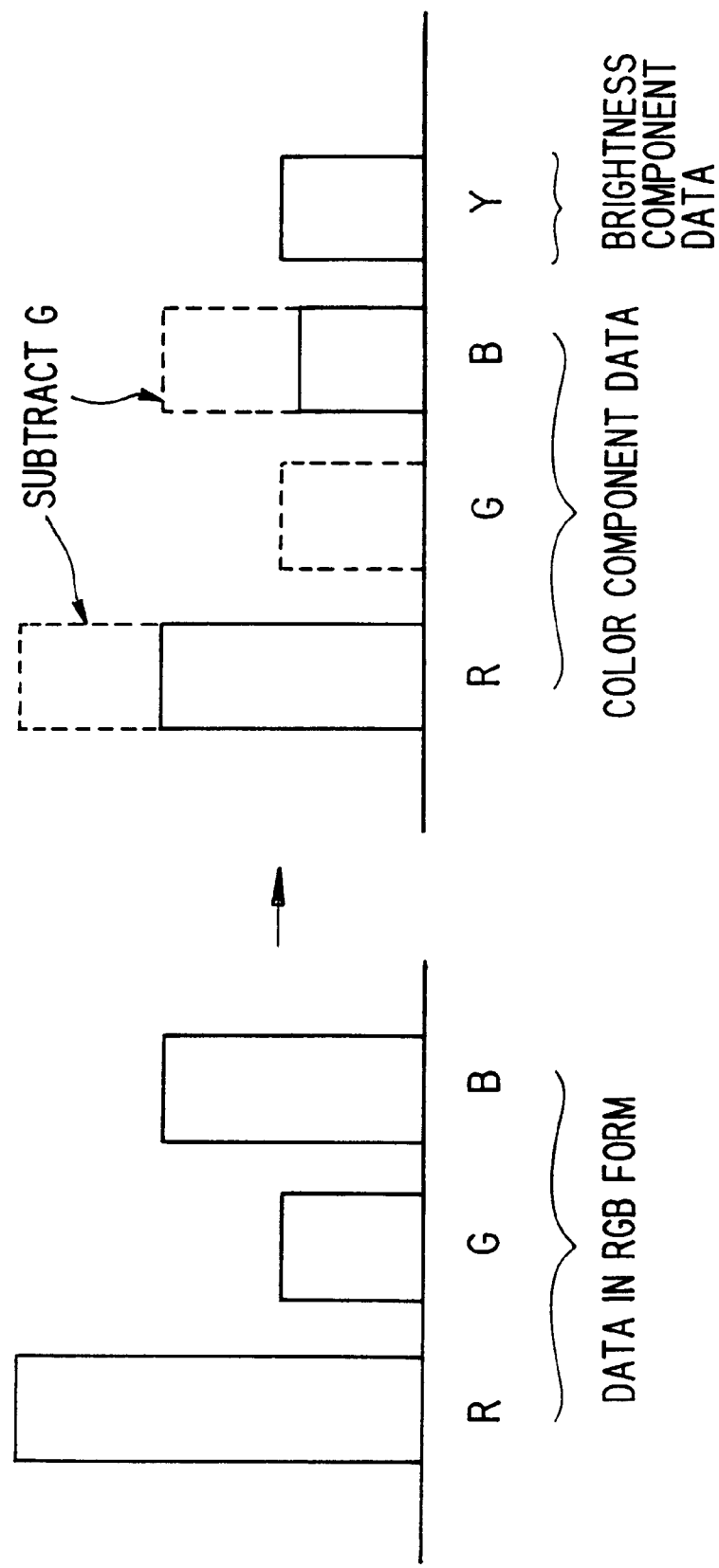

DISPLAY APPARATUS

BACKGROUND OF THE INVENTION

Field of the Invention

The present invention relates to a display apparatus using a plurality of liquid-crystal panels and, more particularly, to a display apparatus such as a projector which is capable of displaying brightly a document written with small characters by a large number of pixels and displaying a color gradation and a moving picture.

With the recent spread of notebook type personal computers, display apparatus such as a liquid-crystal projector which is capable of enlarging the image displayed on a screen of a personal computer and projecting the enlarged image for the purpose of presentation have come into wide use, and there is a demand for a further improvement of a picture quality (bright and clear picture, high resolution, enhancement in color reproducibility, etc.) and a reduction in size of such display apparatuses.

Various techniques have been developed to meet such a demand. For example, the opening of each pixel of liquid crystal panel is enhanced, the light quantity of a light source is increased, a liquid-crystal panel which does not use polarized light is utilized, a liquid-crystal panel having a high resolution is adopted, the characteristics of a color filter are improved, and a pixel pitch on a liquid-crystal panel is reduced.

A projection optical system in a projector is composed of a light source such as a halogen lamp, a liquid-crystal panel and an optical system such as a mirror and a lens. Projectors are divided into two types depending on the optical system, i.e., a single-panel projector using one liquid-crystal panel as shown in FIG. 15A and a three-panel projector using three liquid-crystal panels as shown in FIG. 15B.

In the single-panel projector shown in FIG. 15A, the reference numeral 101 represents a light source such as a halogen lamp, 102 a liquid-crystal panel on which a picture is displayed, 103 a condenser lens for collecting light from the light source 101, 104 a projection lens for enlarging the picture displayed on the liquid-crystal panel 102 and displaying the enlarged picture on a screen, and 105 a screen. In the single-panel projector, light is projected from the light source 101 onto the picture displayed on the liquid-crystal panel 102, and the transmitted light is projected on the screen 105. Such a single-panel projector is characterized in that since only one panel is used, the size of the apparatus is small and the price thereof is low. However, since one pixel region is divided into three regions, i.e., red, green and blue regions, and the light transmittance/cutoff in each region is controlled in accordance with R data, G data and B data, the light transmittance is low and the picture becomes dark.

In the three-panel projector shown in FIG. 15B, the reference numeral 111 represents a light source such as a halogen lamp, 112 a dichroic mirror for reflecting red light which is contained in the white light from the light source 111 and transmitting the other (green and blue) light, 113 a dichroic mirror for reflecting green light and transmitting the other (red and blue) light, 115 a dichroic mirror for reflecting blue light and transmitting the other (red and green) light, 116 to 117 mirrors, 118 to 120 liquid-crystal panels on which pictures are displayed, 121 a projection lens for enlarging picture (color picture) which is obtained by synthesizing the red, blue and green pictures transmitted from the respective liquid-crystal panels and displaying the enlarged picture on a screen, and 122 a screen.

The light transmittance/cutoff of each pixel of the liquid-crystal panel 118 is controlled in accordance with the B data of the RGB color pixel data, the light transmittance/cutoff of each pixel of the liquid-crystal panel 119 is controlled in accordance with the G data of the RGB color pixel data, and the light transmittance/cutoff of each pixel of the liquid-crystal panel 120 is controlled in accordance with the R data of the RGB color pixel data. As a result, the red, blue and green synthesized picture (color picture) is output from the dichroic mirror 115, and the picture is enlarged and displayed on the screen 122 by the projection lens 121.

According to such a three-panel projector, since light passes all the regions of one pixel, a brighter picture is obtained than a picture produced by single-panel projector. However, since three liquid-crystal panels are used, a large-scale structure is necessary and hence, the cost is unfavorably high.

The liquid-crystal panel has polarizing plates 132, 133 on both sides of a liquid-crystal layer 131, as shown in FIG. 16. The polarizing plate 132 transmits, for example, S-polarized light and the polarizing plate 133 transmits P-polarized light. The S-polarized light which passes the polarizing plate 132 rotates in the liquid-crystal layer 131, passes the transparent portion, goes out as P-polarized light and passes the polarizing plate 133.

Projectors are also divided into two types depending upon the projection form. One is a projector which projects a picture onto a screen on a wall, and the other is a projector provided with a screen such as a TV set which projects a picture from the back side of the screen.

As a liquid-crystal panel, a TFT (Thin Film Transistor) liquid-crystal panel is utilized which adopts a combination of a TN (Twisted Nematic) display mode and active matrix drive by the TFT. The TFT liquid-crystal is characterized by a high contrast, display of a color gradation, and a comparatively high speed (which enables display of a moving picture).

In the TFT liquid-crystal panel which is utilized in a conventional display apparatus such as a projector, an increase in the number of pixels leads to a rise in the cost, so that the maximum number of pixels is about 1280×1024 in the present state. It is therefore impossible for the TFT liquid-crystal to display an image of the size A4 (210×297 mm) in one screen. If it is obliged to display the image of the size A4 in one screen, the resolution is degenerated, so that the characters blur and become difficult to read, much less an image of a larger size such as B4 (257×364 mm) and A3 (297×420 mm). That is, it is impossible to display a document for such a large size in one screen of a TFT liquid-crystal panel with legible characters.

In addition, since the TFT liquid-crystal requires the two polarizing plates 132, 133, as shown in FIG. 16, as a property of the liquid-crystal material, it is only less than ½ (ordinary transmittance is 35 to 40%) of the total light quantity of the light source that can be utilized, so that the light transmittance is low (about 20% in monochrome display such as black-and-white display, about 5% in color display) and the picture becomes comparatively dark and indistinct.

A panel which dispenses with a polarizing plate has been proposed as a liquid-crystal panel which has a large number of pixels and which is bright. For example, it has been confirmed that nematic-cholesteric phase transition liquid-crystal utilizing the light transmittance and scattering dispenses with a polarizing plate and realizes as many as 3500×2500 pixels at its maximum (by Mochizuki et al, Super High Information Content Projection Display Using an NCPT Liquid Crystal, FSTJ, vol 128, 3, PP 369 to 376, 1992). Since there is no light absorption by a polarizing plate, the picture is bright; for example, the light transmittance is not less than 60% in monochrome display (black-and-white display). According to this liquid-crystal, it is possible to display an image of the size B4 or A3 with high definition and brightness to the same extent as in printing unlike the TFT liquid-crystal. However, since it takes several seconds to rewrite on this liquid-crystal panel and the rewriting speed is lower as compared with the rewriting speed by a CRT, which is several ten milliseconds, it is impossible to display a moving picture. In addition, it is impossible to display a color gradation.

SUMMARY OF THE INVENTION

Accordingly, it is an object of the present invention to eliminate the above-described problems in the related art and to provide a display apparatus such as a projector which is capable of displaying brightly a document written with small characters by a large number of pixels and displaying a color gradation and a moving picture.

To achieve this end, the present invention provides a display apparatus using a plurality liquid-crystal panels comprising: an optical device for separating the light from a light source for projection into two polarized light beams; a first liquid-crystal panel which includes a polarizing plate and to which a first polarized light beam separated by the optical device is input; a second liquid-crystal panel which has no polarizing plate and to which a second polarized light beam separated by the optical device is input; a data separating means for separating display data into data for the first liquid-crystal panel and data for the second liquid-crystal panel; a first liquid-crystal panel display controller for controlling the color display of the first liquid-crystal panel in accordance with the separated data for the first liquid-crystal panel; a second liquid-crystal panel display controller for controlling the monochrome display of the second liquid-crystal panel in accordance with the separated data for the second liquid-crystal panel; and an optical system for synthesizing the pictures on the first and second liquid-crystal panels and displaying the synthesized picture on a screen.

Other features and advantages of the present invention will be apparent from the following description taken in conjunction with the accompanying drawings.

BRIEF DESCRIPTION OF THE DRAWINGS

FIG. 6 is an explanatory view of a data separator for separating RGB data for each pixel into a brightness component and color components;

FIG. 7 is an explanatory view of a method of separating RGB data into a brightness component and color components;

DESCRIPTION OF THE PREFERRED EMBODIMENTS (A) Schematic explanation of the invention The present invention utilizes the fact that display data can be divided into a monochrome component or data for the monochrome region and a color component or data for the color region. The present invention also utilizes the property of human eyes that although human eyes are sensitive to an image which has many high-frequency components and clear edges such as a character and a line drawing, they are not so sensitive to an image which has a comparatively few high-frequency components such as a color still picture and a moving picture. More specifically, in the present invention, a monochrome component or a monochrome picture such as a character and a line drawing is displayed by a monochrome display device (e.g., phase transition liquid-crystal panel) which is composed of a multiplicity of pixels and which has a high resolution, while a color component or a color still picture, which does not require a high resolution, is displayed by a color display device (e.g., TN liquid-crystal panel) which has fewer pixels than a monochrome display device but which is capable of displaying a color picture and a moving picture.

Figure 1:
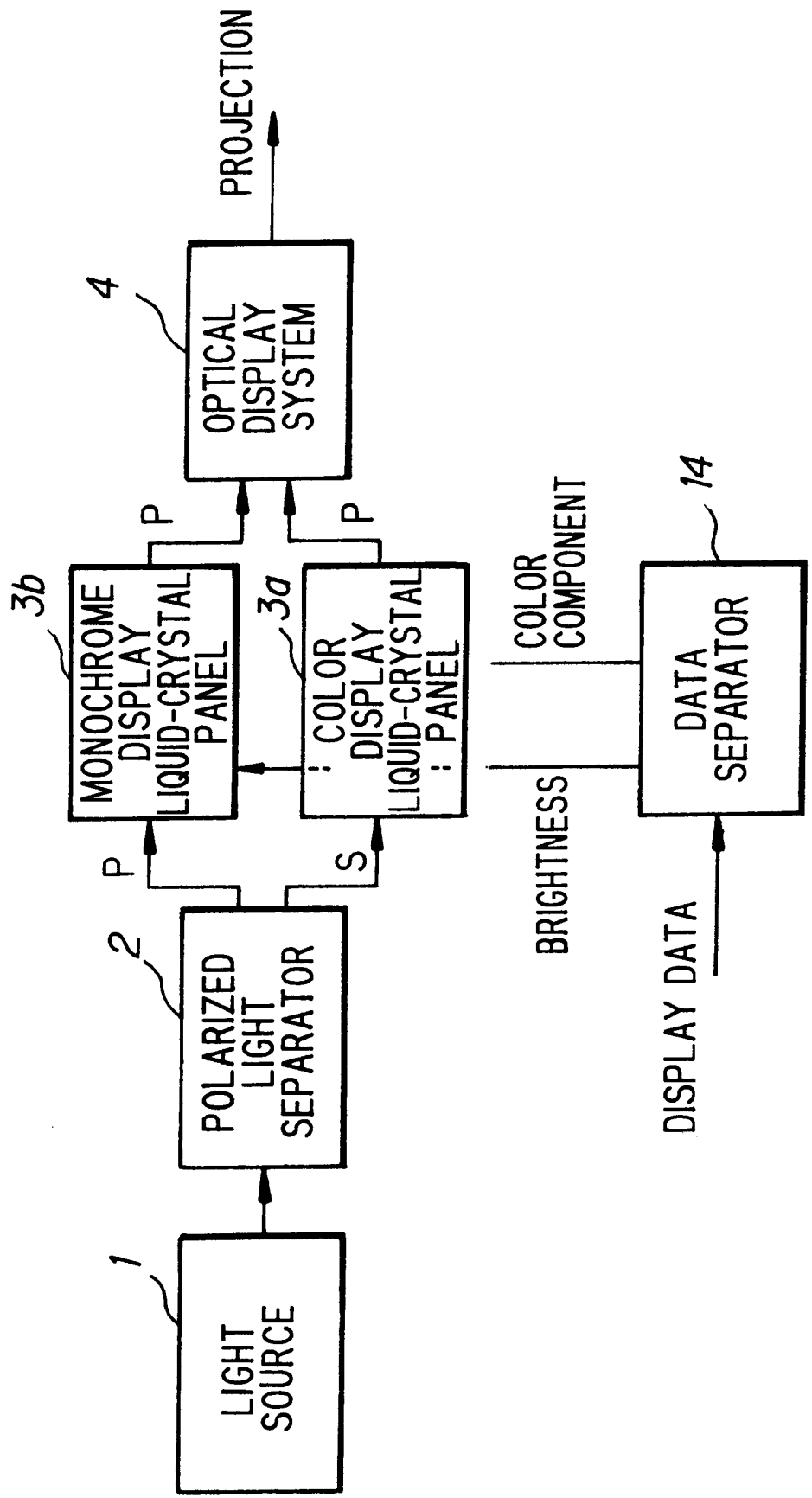
FIG. 1 schematically explains the structure of the present invention.

FIG. 1 schematically explains the structure of the present invention. In FIG. 1, the reference numeral 1 represents a light source such as a halogen lamp, 2 a polarized light beam splitter (polarized light separator) for separating the light from the light source 1 into two polarized light beams (P-polarized light and S-polarized light), 3a a first liquid-crystal panel (color display liquid-crystal panel such as a TN liquid-crystal panel) which includes a polarizing plate and to which a first polarized light beam (S-polarized light) which is separated by the polarized light separator is input, 3b a second liquid-crystal panel (monochrome display liquid-crystal panel such as a phase transition liquid-crystal panel) which does not have a polarizing plate and to which a second polarized light beam (P-polarized light) separated by the optical device is input, 4 an optical display system for synthesizing the pictures on the first and second liquid-crystal panels and projecting the synthesized picture on a screen, and 14 a data separator for separating display data into data for the first liquid-crystal panel and data for the second liquid-crystal panel.

The data separator 14 separates display data into data (color component data) for the first liquid-crystal panel 3a and data (brightness data) for the second liquid-crystal panel 3b, and controls the color display of the first liquid-crystal panel 3a in accordance with the color component data and the monochrome display of the second liquid-crystal panel 3b in accordance with the brightness data. In parallel with this, the polarized light separator 2 separates the light from the light source 1 into S-polarized light and P-polarized light, throws the S-polarized light on the color picture produced on the first liquid-crystal panel 3a, from the back side thereof, and leads the color picture to the optical display system 4 through a polarizing plate (not shown). The polarized light separator 2 also throws the P-polarized light on the monochrome picture produced on the second liquid-crystal panel 3b, from the back side thereof, and leads the monochrome picture to the optical display system 4. The optical display system 4 synthesizes two incident pictures, enlarges the synthesized picture and projects it on a screen.

The data separator 14 can also separate display data into display data for the color region and display data for the monochrome region, and controls the first liquid-crystal panel (TN liquid-crystal panel) 3a so as to display a color picture in accordance with the display data for the color region and the second liquid-crystal panel (phase transfer liquid-crystal panel) 3b so as to display a monochrome picture in accordance with the display data for the monochrome region.

In this manner, it is possible to display a color picture on a TN liquid-crystal panel which is capable of displaying a color gradation, and to display a monochrome picture such as characters with a high definition on a phase transfer liquid-crystal panel which is capable of displaying a monochrome picture with high definition. Human eyes are sensitive to an image which has many high-frequency components, in other words, an image which has clear edges. According to the present invention, since a monochrome picture such as characters is displayed on the second liquid-crystal panel (phase transfer liquid-crystal panel) which has a large number of pixels and a high resolution, there is no problem in this point. On the other hand, human eyes are not so sensitive to an image which has a comparatively few high-frequency components such as a color still picture and a moving picture. For this reason, even if a color picture is displayed on the first liquid-crystal panel (TN liquid-crystal panel) which has a small number of pixels, as in the present invention, the small number of pixels does not matter to human eyes. In addition, the separated S-polarized light and P-polarized light are synthesized after they pass the liquid-crystal panels. Further, since the polarized light separator 2 separates the S-polarized light and P-polarized light, the first liquid-crystal panel (TN liquid-crystal panel) 3a is dispensed with a polarizing plate on the entrance side and requires a polarizing plate only on the exit side, thereby the light transmittance of the first liquid-crystal panel 3a is therefore increased. As a result it is possible to display a bright picture. In other words, both the display of a bright color gradation and a moving picture and the display of a monochrome picture with high definition are realized.

The numbers of pixels per screen of the data for the first and second liquid-crystal panels which are separated by the data separator 14 are converted into the number of pixels of the liquid-crystal panels 3a and 3b, respectively, and the respective liquid-crystal panels are so controlled as to display a color picture and a monochrome picture. In this manner, it is possible to synthesize the pictures of the same size on the respective panels with the respective resolutions and display the synthesized picture.

When the display data is input by an RGB form for each pixel and the display data is separated into color component data and brightness component data, the data separator 14 is composed of (1) a means for detecting the lowest level of the R, G and B levels for each pixel, (2) a means for subtracting the minimum value from each of said R, G and B levels, and outputting the results as said color component data of the corresponding pixel, and (3) a means for converting said lowest level into binary data and outputting it as a brightness component of said corresponding pixel. In this manner, it is possible to separate the display data into the color component data and the brightness component by a simple structure.

When the display data is input by an RGB form for each pixel and the display data is separated into data for the color region and data for the monochrome region, the data separator 14 is composed of (1) a means for detecting the lowest level and the highest level from the R level, the G level and the B level for each pixel, (2) a means for calculating the difference between the two items of data, (3) a means of comparing the difference with a preset value, (4) a means for judging whether a pixel is one for the color region or one for the monochrome region on the basis of the result of comparison by the means (3) with respect to all the pixels and separating the display data into data for the color region and data for the monochrome region, and (5) a means for outputting the respective display data for the color region and the monochrome region. In this manner, it is possible to separate the display data into display data for the color region and display data for the monochrome region and output the respective item of data by a simple structure.

A light quantity adjusting means for adjusting the light quantity is provided on the optical path of the second liquid-crystal panel (TN liquid-crystal panel) 3b which does not include a polarizing plate, and the light quantity adjusting means adjusts the light quantity so that the brightness of a monochrome picture is the same as the brightness of a color picture. In this manner, it is possible to display a picture easy to see.

A means for detecting whether display data is still picture data or moving picture data is provided. If the display data is moving picture data, all the display data is assumed as data for the first liquid-crystal panel 3a, while if the display data is still picture data, it is divided into data for the first liquid-crystal panel 3a and data for the second liquid-crystal panel 3b. According to this structure, when the display data is moving picture data, since the data separation process is unnecessary, it is possible to project a moving picture at a high speed.

A means for judging whether or not approximately the entire part of data for one screen is monochrome data is provided, and if the answer is in the affirmative, the first liquid-crystal panel (TN liquid-crystal panel) 3a is removed from the optical path. If a phase transfer liquid-crystal panel is used as the second liquid-crystal panel 3b, since it is capable of utilizing of the light without any influence of polarization, the picture projected becomes brighter.

A display apparatus is composed of a high-definition monochrome liquid-crystal panel, a color liquid-crystal panel which is capable of high-speed operation, a data separator for separating video data into data for a monochrome liquid-crystal panel and data for a color liquid-crystal panel, a first display controller for displaying a monochrome picture on the monochrome liquid-crystal panel in accordance with the data for the monochrome liquid-crystal panel, a second display controller for displaying a color picture on the color liquid-crystal panel in accordance with the data for the color liquid-crystal panel, and an optical system for synthesizing the pictures displayed on these liquid-crystal panels and projecting the synthesized picture on a screen. According to this display apparatus, it is possible to display a color moving picture and a color still picture with a color gradation and to display a monochrome still picture and document with a high resolution, and also to obtain a bright picture.

(B) Embodiment (a) Entire structure

Figure 2:
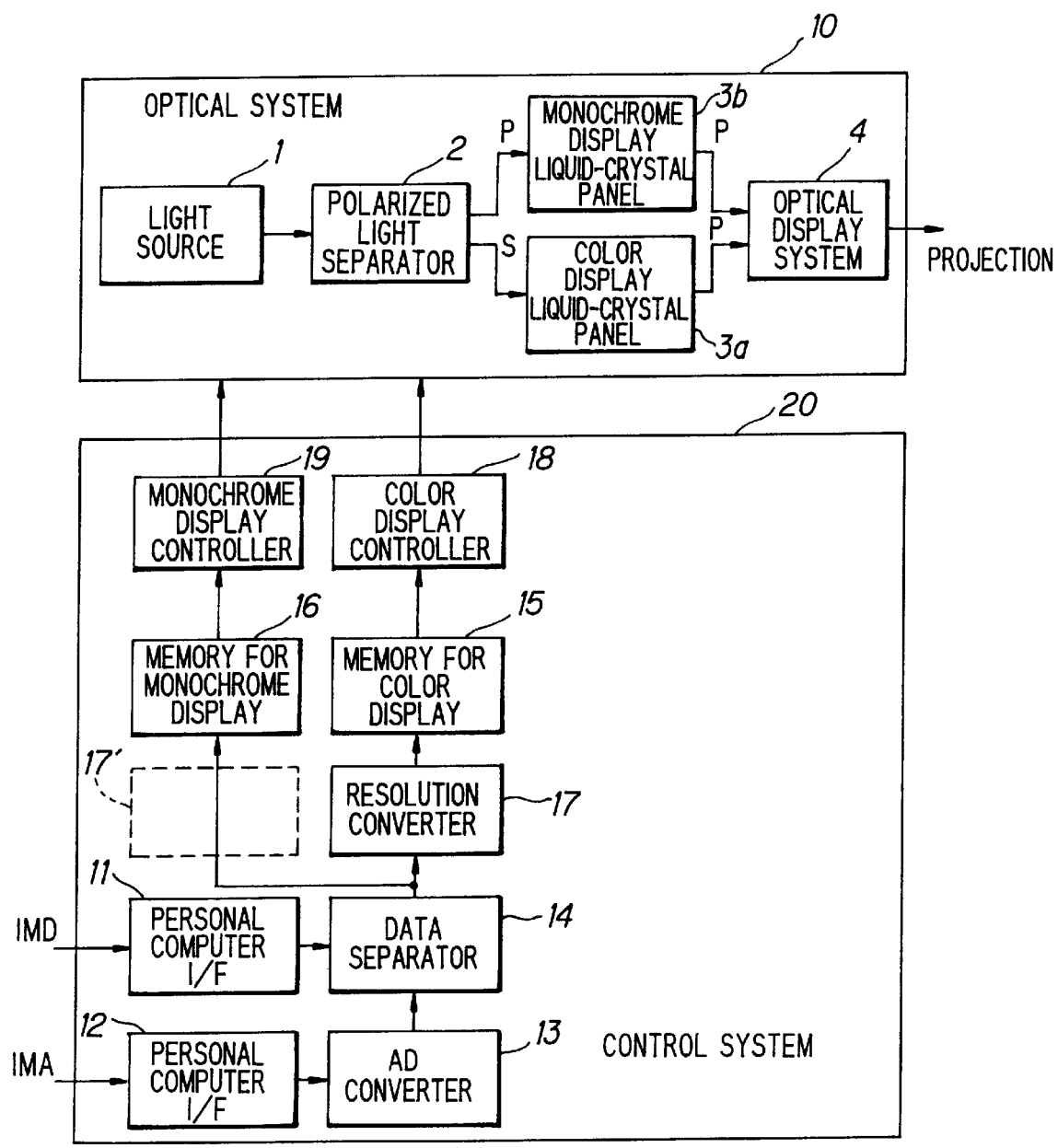
FIG. 2 shows the structure of a projector apparatus.

FIG. 2 shows the structure of a projector apparatus according to the present invention. In FIG. 2, the reference numeral 10 represents an optical system and 20 a control system.

Figure 3:
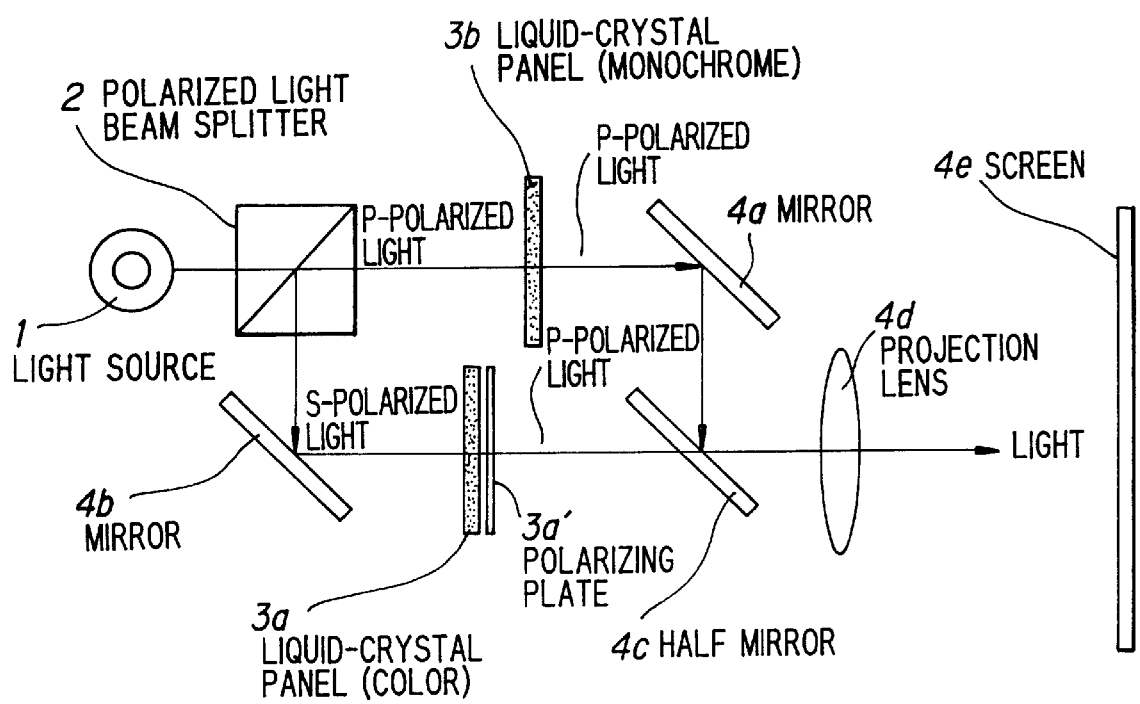
FIG. 3 shows the structure of an optical system.

The optical system 10 is, as shown in detail in FIG. 3, composed of a light source 1 such as a halogen lamp, a polarized light beam splitter 2 (polarized light separator) for separating the light from the light source 1 into two polarized light beams (P-polarized light and S-polarized light), a first liquid-crystal panel 3a (color display liquid-crystal panel such as a TN liquid-crystal panel) which includes a polarizing plate 3a' (see FIG. 3) and to which a first polarized light beam (S-polarized light) separated by the polarized light separator is input, a second liquid-crystal panel 3b (monochrome display liquid-crystal panel such as a phase transition liquid-crystal panel) which does not have a polarizing plate and to which a second polarized light beam (P-polarized light) separated by the polarized light beam splitter 2 is input, and an optical display system 4 for synthesizing the pictures on the first and second liquid-crystal panels and projecting the synthesized picture on a screen. The optical display system 4 is provided with mirrors 4a, 4b, a half mirror 4c, a projection lens 4d for enlarging a picture and projecting the enlarged picture onto a screen and a screen 4e,.

Figure 16:
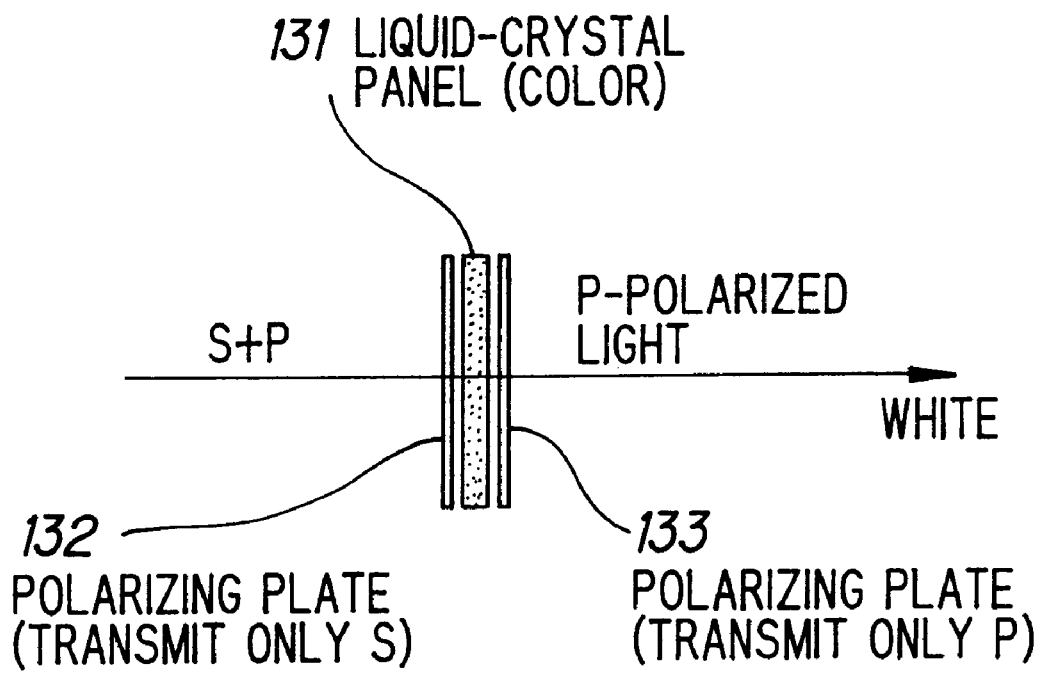
FIG. 16 is an explanatory view of a liquid-crystal panel.

The light from the light source 1 is separated into two kinds of polarized light (S-polarized light and P-polarized light) by the polarized light beam splitter 2 (polarized light separator). One of the polarized light beams (e.g., S-polarized light) is led to the back side of the color display liquid-crystal panel 3a such as a conventional TN liquid-crystal panel which is capable of displaying a color gradation, through the mirror 4b, and illuminates the color display liquid-crystal panel 3a from the back side thereof so as to input the color component or the color picture to the projection lens 4d through the polarizing plate 3a' and the half mirror 4c. The other polarized light beam (e.g., P-polarized light) separated by the polarized light beam splitter 2 (polarized light separator) is led to the back side of the monochrome display liquid-crystal panel 3b which does not use polarized plate and which has a multiplicity of pixels, and illuminates the liquid-crystal panel 3b from the back side thereof so as to input the monochrome component or the monochrome picture (such as characters and a table) to the projection lens 4d through the mirror 4a and the half mirror 4c. The projection lens 4d enlarges and synthesizes the two input components (color component, monochrome component) or the two input pictures (color picture, monochrome picture), and projects the synthesized picture onto the screen 4e. Although an ordinary liquid-crystal panel uses polarizing plates on both sides, as shown in FIG. 16, the liquid-crystal panel 3a shown in FIGS. 2 and 3 uses the polarizing plate 3a' only on the exit side, because it is only one polarized light beam (S-polarized light) that enters the liquid-crystal panel 3a.

In the control system 20, the reference numeral 11 represents a personal computer interface (digital interface) for receiving the digital display data IMD which is transferred from a personal computer, and 12 a personal computer interface (analog interface) for receiving the analog video signal which is transferred from a personal computer. As the digital interface, a parallel interface (IEEE1284) and a high-speed serial interface (USB) which are utilized by a printer or the like are applicable.

The reference numeral 13 represents an AD converter for converting an analog video signal into a digital display data, 14 a data separator for separating display data into color data for the color display liquid-crystal panel 3a and monochrome data for the monochrome display liquid-crystal panel 3b. The color data and the monochrome data for the liquid-crystal panels 3a and 3b are (1) color components and a brightness component or (2) display data for the color region and display data for the monochrome region.

The reference numeral 15 represents a memory for color display for storing the color data for the color display liquid-crystal panel 3a, 16 a memory for monochrome display for storing the monochrome data for the monochrome display liquid-crystal panel 3b, 17 a resolution converter, 18 a color display controller for controlling the color display by the color display liquid-crystal panel 3a in accordance with the color data and 19 a monochrome display controller for controlling the monochrome display by the monochrome display liquid-crystal panel 3b in accordance with the monochrome data.

(b) Data separator

The data separator 14 separates the display data supplied through a personal computer interface into (1) color components and a b rightness component or (2) display data for the color region and display data for the monochrome region.

Separation of display data into (1) color components and a brightness component:

When the display data IMD is composed of a brightness component Y and color components such as Cr and Cb, the data separator 14 separates the respective data and stores them into the memories 16, 15 for monochrome display and color display, respectively. More specifically, the data separator 14 converts the brightness component Y into a binary value and stores it into the memory 16 for monochrome display, and stores the color components Cr, Cb into the memory 15 for color display through the resolution converter 17.

When the display data IMD is not composed of a brightness component Y and color components Cr, Cb and it is supplied in an RGB form for each pixel, the data separator 14 separates the display data in the RGB form into a monochrome component and color components and stores them into the memories 16, 15 for monochrome display and color display, respectively.

Separation of display data into (2) display data for the color region and display data for the monochrome region;

The data separator 14 judges whether the display data supplied through a personal computer interface is display data for the color region or display data for the monochrome region, thereby separates the display data into display data for the color region and display data for the monochrome region.

(c) Resolution converter

If the liquid-crystal panel 3b for monochrome display is composed of a phase transfer liquid-crystal panel having a multiplicity of pixels, the number of pixels is, for example, about 3500×2500 pixels. On the other hand, if the liquid-crystal panel 3a for color display is composed of a TN liquid-crystal panel which is capable of displaying a color gradation and a moving picture, the number of pixels is about 700×500 pixels. That is, the number of pixels is different between the liquid-crystal panel 3a for color display and the liquid-crystal panel 3b for monochrome display. Consequently, when display data for, for example, 3500× 2500 pixels per screen is supplied from a personal computer, it is possible to store the monochrome data for the liquid-crystal panel 3b in the memory 16, as it is, after the display data is separated into the color data and the monochrome data, but it is necessary to convert every 5×5 pixels of the color data for the liquid-crystal panel 3a into 1 pixel before storing it into the memory 15. For this purpose, the resolution converter 17 calculates the average value of color data of 5×5 pixels and stores it into the memory 15 for color display.

When, display data for 700×500 pixels per screen is supplied from a personal computer, it is possible to store the color data for the liquid-crystal panel 3a in the memory 15, as it is, after the display data is separated into the color data and the monochrome data, but it is necessary to convert every pixel of the monochrome data for liquid-crystal panel 3b into the monochrome data of 5×5 pixels and to store them into the memory 16 for monochrome display. In this case, a resolution converter 17' is provided between the data separator 14 and the memory 16 for monochrome display. The resolution converter 17' converts 1 pixel into monochrome data of 5×5 pixels by using the brightness data Y which is obtained by the data separator 14 and stores them into the memory 16 for monochrome display. For example, the correspondence between the level of the brightness Y and the white or black pixel positions of 5×5 pixels is written into a table, and 1 pixel is converted into monochrome data of 5×5 pixels which represents a gradation by reference to the table.

Generally, in a case where N×M pixels per screen in supplied from a personal computer, the resolution converter 17 and the resolution converter 17' are simultaneously is used so that the resolution converter 17 converts N×M pixels to 3500×2500 pixels and the resolution converter 17' converts N×M pixels to 700×500 pixels.

(d) AD converter

Figure 4:
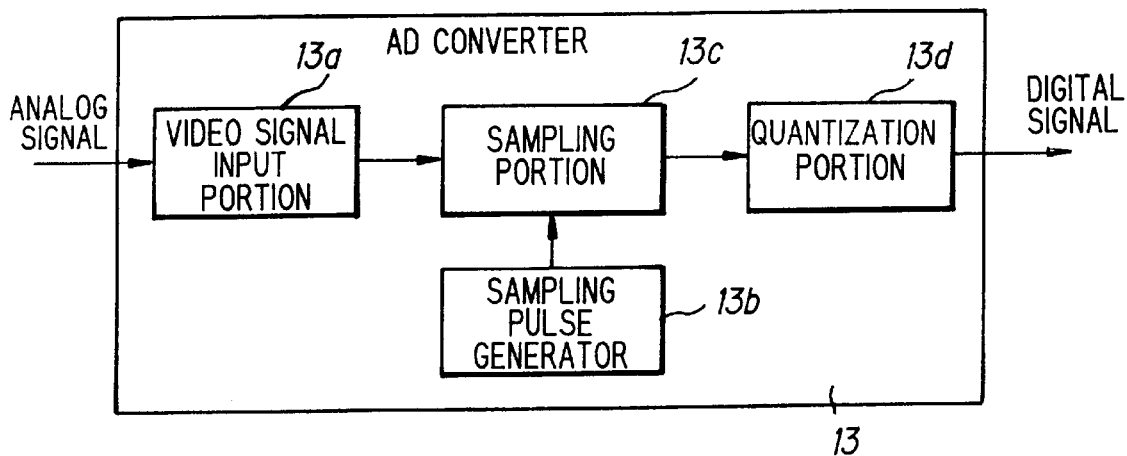
FIG. 4 explains an AD converter.

FIG. 4 is a block diagram showing the structure of the AD converter 13, and FIG. 5 is an explanatory view of AD conversion. In FIG. 4, the reference numeral 13a denotes a video signal input portion, 13b a sampling pulse generator, 13c a sampling portion, and 13d a quantization portion.

Figure 5A:
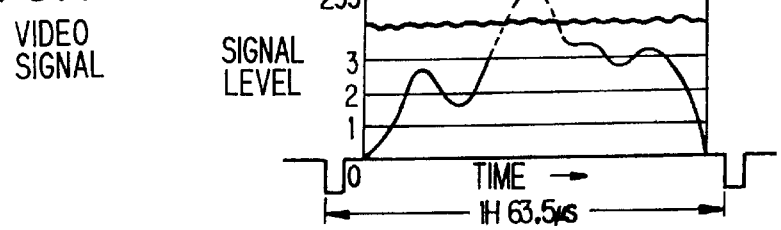
FIGS. 5A to 5D explain AD conversion.
Figure 5B:
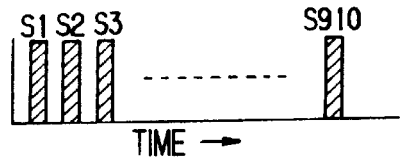
Figure 5C:
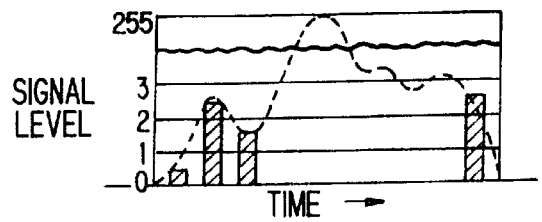
Figure 5D:
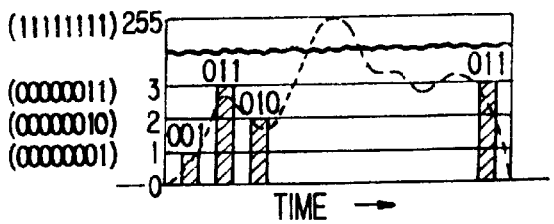

A section for one scanning line of a video signal (FIG. 5A) is divided into about 910 by a sampling pulse (FIG. 5B) of 14.3 MHz, which has four times as high a frequency as a color subcarrier (3.568 MHz), and is taken out as discontinuous momentary values corresponding to video signal levels (sampling). The sample values obtained by sampling are not exactly the same values which are obtained by dividing the video signal into 256 levels. For this reason, quantization for allocating the sample values to the respective closest levels of the video signal which is divided into 256 levels is executed. FIG. 5D shows an example of quantization of a section for one scanning line of a video signal at 256 levels. The quantized video signal is coded into binary digital data and output.

(e) Operation as a whole

The projector apparatus separates the light from the light source 1 into two polarized light beams by the polarized light separator 2 such as a polarized light beam splitter. One of the polarized light beams (e.g., P-polarized light) is led to the monochrome display liquid-crystal panel 3b such as a phase transfer liquid-crystal panel (which has a multiplicity of pixels such as 3500×2500 pixels and which does not utilize polarized light), and the other polarized light beam (e.g., S-polarized light) is led to the color display liquid-crystal panel 3a such as a TN liquid-crystal panel (TFT liquid-crystal panel) which has about 700×500 pixels and which utilizes polarized light.

The data separator 14 separates the display data IMD supplied through the personal computer interface 11 into (1) color components and a brightness component or (2) display data for the color region and display data for the monochrome region, and then stores the color data in the memory 15 for color display after converting the resolution thereof by the resolution converter 17 and stores the monochrome data in the memory 16 for monochrome display without changing the resolution.

When the resolution (number of pixels) of the display data IMD which is input through the personal computer interface 11 is 3500×2500, the resolution converter 17 changes the resolution (number of pixels) of color data so as to match the sizes of the color picture and the monochrome picture projected on the screen. The resolution converter 17 lowers the resolution of the color data by a technique such as averaging and simple thinning.

The resolution converter 17 may be provided with an automatic judgement system which lowers the resolution of color data or raises the resolution of monochrome data in accordance with the resolution (number of pixels per screen) of the display data IMD. If the resolution of the display data is higher than the preset resolution 700×500 pixels of the liquid-crystal display panel 3a (for example, if the resolution of the display data IMD is 3500×2500 pixels), the automatic judgement system lowers the resolution of the color data. If the resolution of the display data IMD is lower than the preset resolution 3500×2500 pixels of the liquid-crystal display panel 3b (for example, if the resolution of the display data IMD is 700×500 pixels), the automatic judgement system raises the resolution of the monochrome data.

The color display controller 18 and the monochrome display controller 19 produce predetermined pictures by controlling the liquid-crystal panel 3a for color display and the liquid-crystal panel 3b for monochrome display by using the color and monochrome data stored in the memories 15 and 16, respectively. The pictures produced are synthesized by the optical display system 4 and projected and displayed on a screen. In this case, since the resolution of the color picture and the monochrome picture are converted so that the pictures projected on the screen have the same size, the color components and the monochrome component are synthesized and displayed on the screen on the same scale.

According to the above-described structure, it is possible to display a monochrome component or a monochrome picture in the monochrome region with a high resolution and color components or a color picture in the color region with a color gradation, so that display with a high resolution and display of a color gradation are both possible. In addition, since a color picture utilizes one of the two polarized light beams (S-polarized light and P-polarized light) and a monochrome picture utilizes the other, the light from the light source is efficiently utilized and there is little heat produced.

In the above explanation, digital display data is input, but analog display data (video signal) may be input instead. Digital data is suitable for processing such as the separation of signals, while analog data such as video signals is suitable for the transmittance of data such as a moving picture at a high speed. When an analog video signal is input, the AD converter 13 converts the video signal into a digital signal and inputs it into the data separator 14. The data separator 14 then executes the subsequent processing.

(f) Structure of data separator

The data separator 14 separates the display data IMD supplied through the personal computer interface 11 into (1) colors components and a brightness component or (2) display data for the color region and display data for the monochrome region.

(f-1) Structure of the data separator in the case of separating data into color components and a brightness component FIG. 6 is an explanatory view of the data separator 14 in the case of separating display data of each pixel provided in an RGB form into color components and a brightness component, and FIG. 7 is an explanatory view of the method of separating the RGB data into color components and a brightness component.

In the data separator 14, the reference numeral 21 represents a minimum value detector for detecting the lowest level among the R level, G level and B level for each pixel, 22 a data calculation/judgement portion for subtracting the lowest level of the R level, the G level and the B level from each of the three levels and outputting the results as the color component data, 23 a binary coding portion for converting the lowest level into binary data and outputting the data obtained as the brightness component data.

With respect to each pixel, the minimum value of the R, G and B data is obtained by the minimum value detector 21, and the value obtained is subtracted from the value of the R, G and B data respectively by the data calculation/judgement portion 22. The minimum value of the three items of data is output as the brightness component data Y and the values (one is 0) obtained by subtracting the minimum value from each of the three items of data are output as the color component data. The color component data are transferred to the memory 15 for color display through the resolution converter 17, and displayed on the liquid-crystal panel 3a for color display under the control of the color display controller 18.

The phase transfer liquid-crystal panel used as the liquid-crystal panel 3b for monochrome display cannot display a color gradation. Therefore, the brightness component data Y is converted into a binary value by the binary coding portion 23, transferred to the memory 16 for monochrome display, and displayed on the liquid-crystal panel 3b for monochrome display under the control of the monochrome display controller 19. In order to obtain a binary value, an error diffusion method which produces a good picture quality is adopted for a natural picture, while a simple binary method using a threshold value is adopted for characters and the like.

According to the above-described data separator, the separation of color data (color components) and monochrome data (bright component) is performed certainly, so that both the color display of the gradations and the monochrome display with a high resolution are easily realized. In addition, since the displayed pictures are overlapped with each other on a screen, it is possible to project a bright picture with fresh colors.

Figure 8:
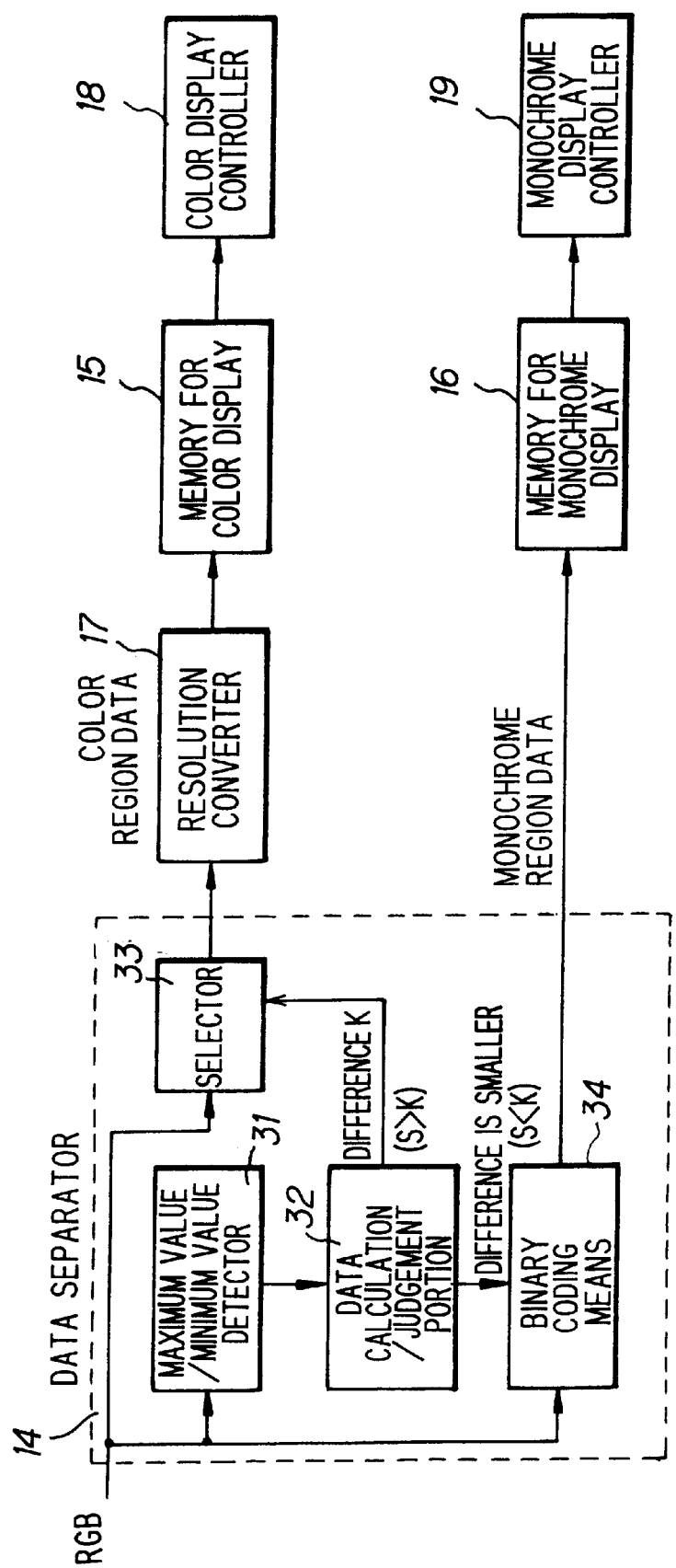
FIG. 8 is an explanatory view of a data separator for separating data into data for the monochrome region (black-and-white region) and data for the color region.
Figure 9:
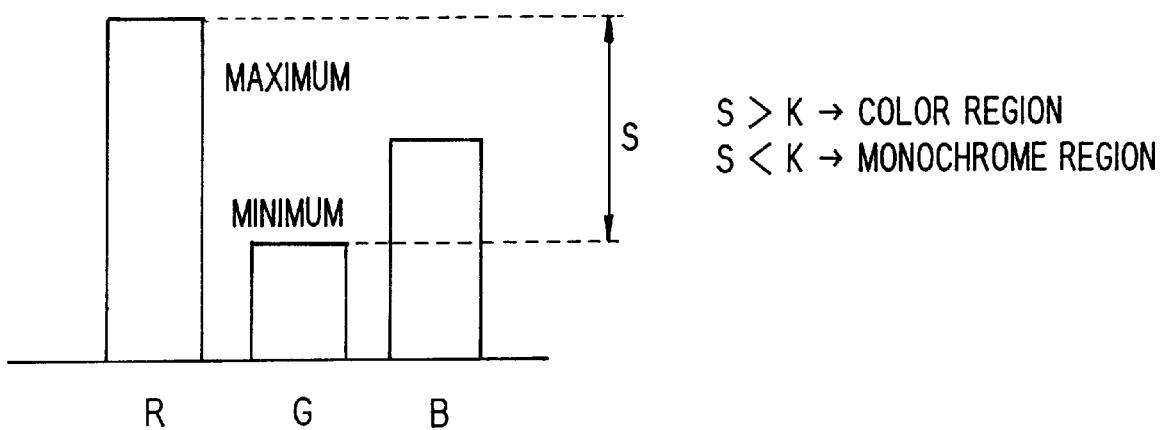
FIG. 9 is an explanatory view of color region/monochrome region judgement.

(f-2) Structure of the data separator in the case of separating data into display data for the color region and display data for the monochrome region FIG. 8 is an explanatory view of the data separator 14 in the case of separating display data provided in an RGB form into display data for the color region and display data for the monochrome region.

In the data separator 14, the reference numeral 31 represents a maximum value/minimum value detector for detecting the lowest level and the highest level among the R level, G level and B level for each pixel, 32 a data calculation/judgement portion for calculating the difference S between the lowest level and the highest level, comparing the difference S with a preset value K, and judging whether the data is data for the color region (S>K) or data for the monochrome region (S<K), 33 a selector for selecting and outputting the RGB data for the color region, and 34 a binary coding portion for obtaining a brightness component from the RGB data for the monochrome region and converting the brightness component into a binary value and outputting it.

With respect to each pixel, the minimum value and the maximum value of the R, G and B data is obtained by the maximum value/minimum value detector 31, and the difference S between the maximum value and the minimum value obtained is calculated by the data calculation/judgement portion 32. The data calculation/judgement portion 32 compares the difference S with a preset value K and judges that the data is one for the color region if S>K, while judging that the data is one for the monochrome region if S<K. This judgement utilizes the fact that the RGB values are small in monochrome data (a chromatic color).

The RGB data for the color data is selected by the selector 33, transferred to the memory 15 for color display through the resolution converter 17, and displayed on the liquid-crystal panel 3a for color display under the control of the color display controller 18.

The phase transfer liquid-crystal panel used as the liquid-crystal panel 3b for monochrome display cannot display a color gradation. Therefore, the display data for the monochrome region is converted into a binary value by the binary coding portion 34, transferred to the memory 16 for monochrome display, and displayed on the liquid-crystal panel 3b for monochrome display under the control of the monochrome display controller 19. In order to obtain a binary value, an error diffusion method which produces a good picture quality is adopted for a natural picture, while a simple binary method using a threshold value is adopted for characters and the like.

According to the above-described data separator, the separation of display data for the color region and display data for the monochrome region is performed certainly, so that both the color display of the gradations and the monochrome display with a high resolution are easily realized. In addition, since the displayed pictures are overlapped with each other on a screen, it is possible to project a bright picture with fresh colors.

Figure 10:
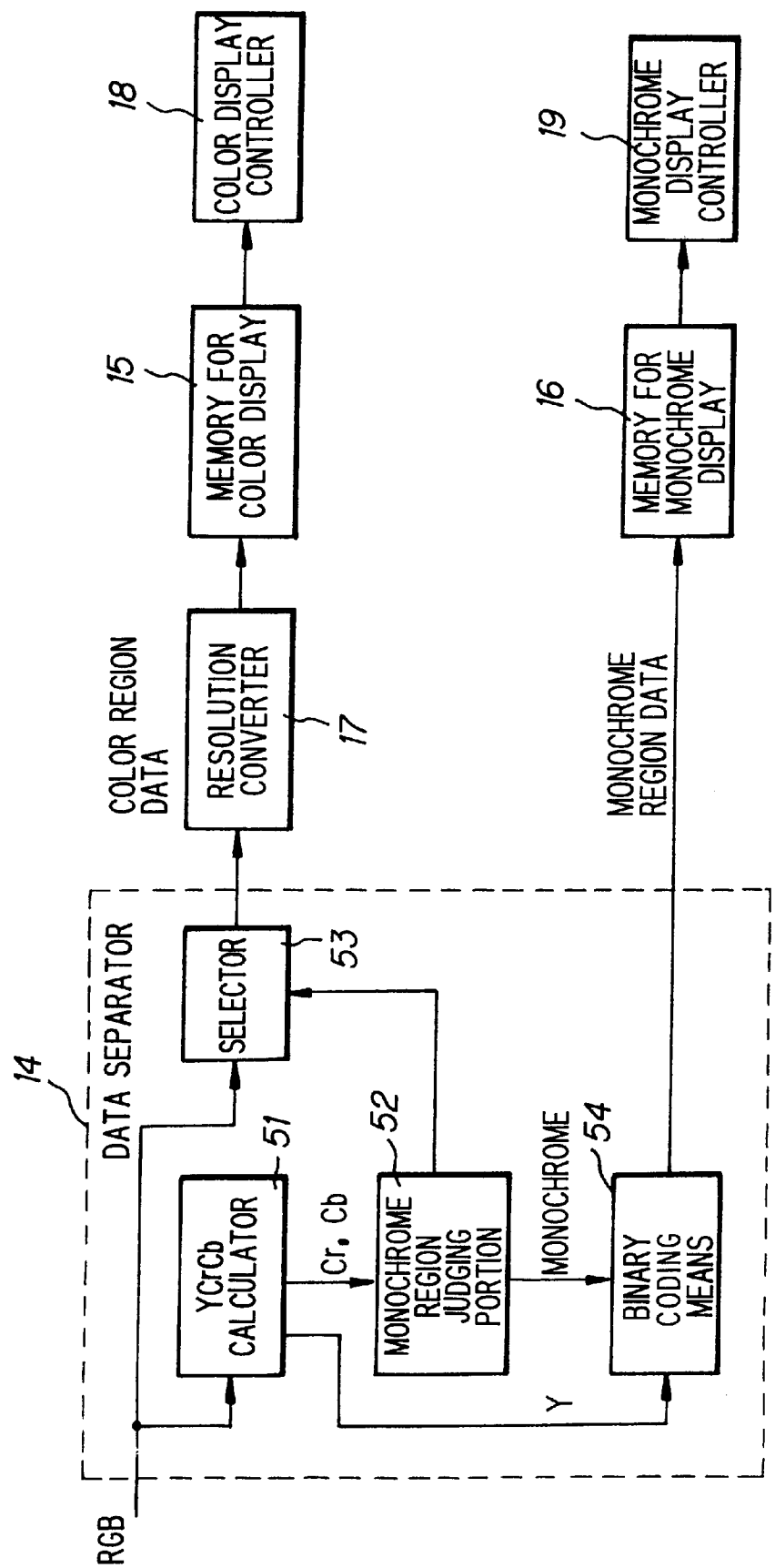
FIG. 10 is an explanatory view of a data separator for converting RGB data for each pixel into YCrCb data and separating the YCrCb data into data for the color region and data for the monochrome region.

(f-3) Another structure of the data separator in the case of separating data into display data for the color region and display data for the monochrome region FIG. 10 is an explanatory view of another structure of the data separator 14 in the case of separating display data provided in an RGB form into display data for the color region and display data for the monochrome region.

In the data separator 14, the reference numeral 51 represents a calculator for calculating Y, Cr (=R−G) and Cb=(B−C) from the R level, the G level and the B level for each pixel, 52 the monochrome region judging portion for judging the monochrome region/color region by using the Cr and Cb data, 53 a selector for selecting and outputting the RGB data for the color region, and 54 a binary coding means for converting a brightness component Y into the binary code. The calculator 51 converts the RGB data into YCrCb data and the monochrome region judging portion 52 judges whether the data is for the color region or the monochrome region from the CrCb data. In the YCrCb-data, Cr and Cb represent color components and when both Cr and Cb are 0, it means that the data is for the monochrome region. Therefore, when Cr+Cb>K' or Cr·Cr+Cb·Cb>K', the data is judged to be for the color region and in the other cases, the data is judged to be for the monochrome region. The symbol K' is a preset constant.

The RGB data for the color region is selected by the selector 53, transferred to the memory 15 for color display through the resolution converter 17, and displayed on the liquid-crystal panel 3a for color display under the control of the color display controller 18.

The phase transfer liquid-crystal panel provided with multiplicity of pixels and used as the liquid-crystal panel 3b for monochrome display cannot display a color gradation. Therefore, the brightness component Y for the monochrome region is converted into a binary value by the binary coding portion 54, transferred to the memory 16 for monochrome display, and displayed on the liquid-crystal panel 3b for monochrome display under the control of the monochrome display controller 19.

(g) Another structure of an optical system

When color picture is displayed on the liquid-crystal panel 3a for color display and monochrome picture is displayed on the liquid-crystal panel 3b for monochrome display which is composed of a phase transfer liquid-crystal panel, since the transmittance is different between the liquid-crystal panels 3a and 3b (the transmittance (25%) of the phase transfer liquid-crystal panel is about five times as high as that (5%) of the TFT color panel), the picture projected onto the screen is not easy to see. As a countermeasure, the brightness(es) of either or both of the color picture and the monochrome picture is adjusted so as to make them match each other.

Figure 11:
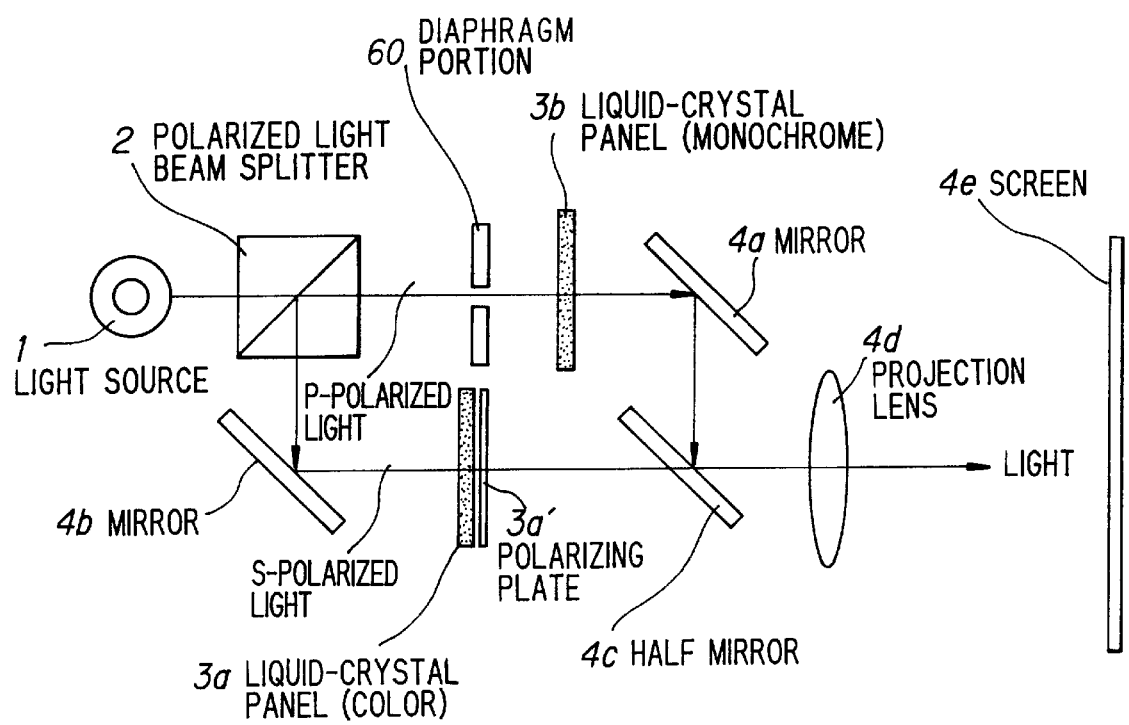
FIG. 11 is an example of an optical system for matching the brightness of a color picture with the brightness of a monochrome picture (black-and-white picture)

FIG. 11 shows the structure of an optical system provided with such a brightness adjusting function. In FIG. 11, the same reference numerals are provided for the elements which are the same as those shown in FIG. 3. This optical system is different from that shown in FIG. 3 in that a diaphragm portion 60 for adjusting light quantity is provided on the optical path between the polarized light beam splitter 2 and the liquid-crystal panel 3b for monochrome display. In the case of displaying a color picture on the TFT liquid-crystal panel and a monochrome picture on a phase transfer liquid-crystal panel, the transmittance of the phase transfer liquid-crystal panel is about 5 times as high as that of the TFT liquid-crystal panel, as described above, so that in order to make the brightness match each other, the light quantity input to the liquid-crystal panel for 3b for monochrome display is reduced to about ⅕ by adjusting the diaphragm portion 60. As a result, the light quantity for monochrome display and the light quantity for color display become the same, so that the synthesized picture is easy to see. The aperture of the diaphragm may be made variable if the user wants to adjust it. As the diaphragm portion 60, a diaphragm for regulating the area of an optical path which is used for general cameras is usable.

(h) Still picture/moving picture display control

When a phase transfer liquid-crystal panel is used as the liquid-crystal panel 3b for monochrome display, since it takes several seconds per screen to change the image of liquid-crystal, it is difficult to display a moving picture on the liquid-crystal panel 3b. As a countermeasure, in the case of a moving picture, display data is not separated and it is displayed only on the liquid-crystal panel 3b (TN liquid-crystal panel) for color display.

Figure 12:
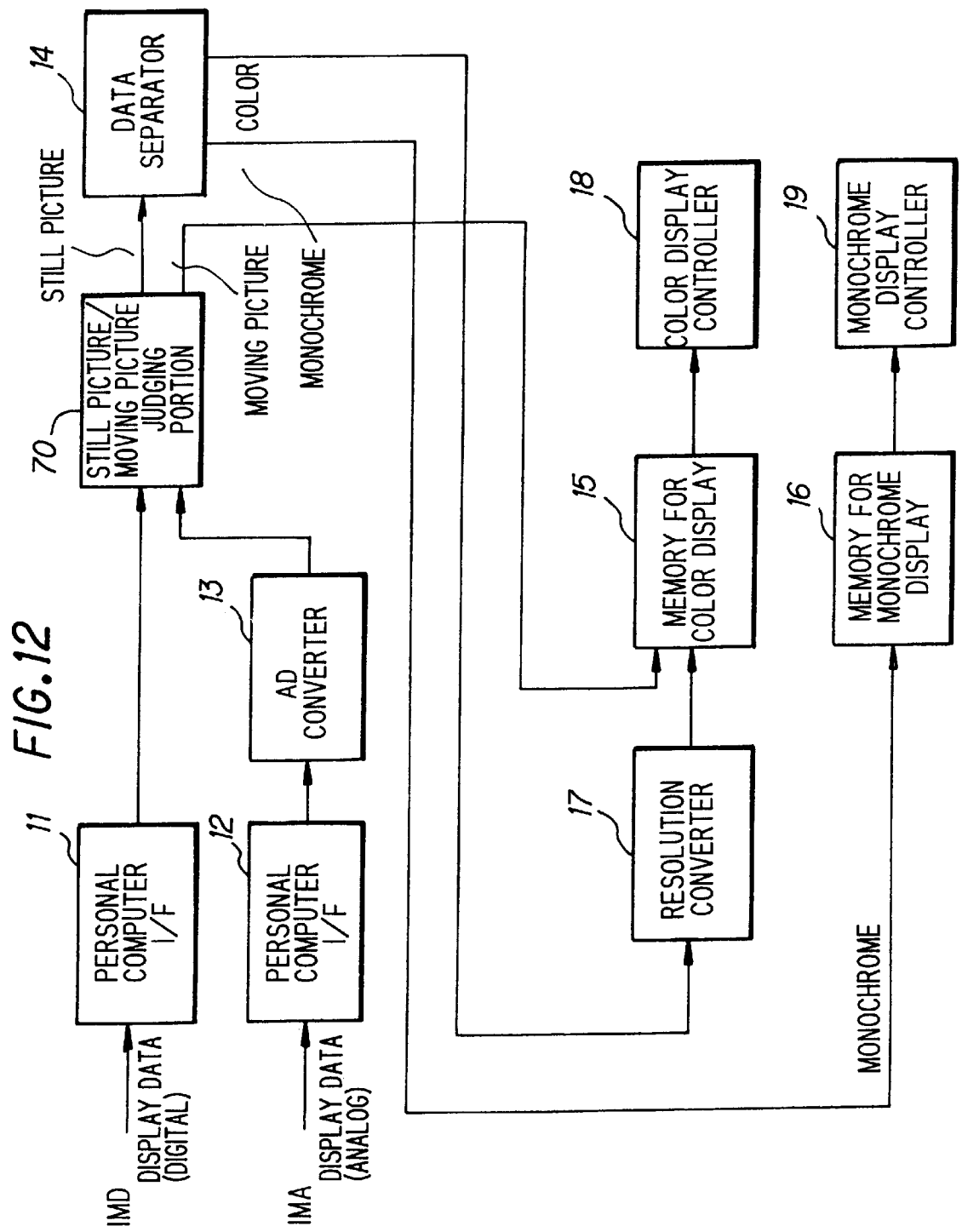
FIG. 12 is an explanatory view of still picture/moving picture display control.

FIG. 12 shows the structure of such a still picture/moving picture display control system. In FIG. 12, the same reference numerals are provided for the elements which are the same as those shown in FIG. 2. This control system is different from that shown in FIG. 2 in that a still picture/moving picture judging portion 70 for judging whether display data is for a still picture or a moving picture is provided.

The still picture/moving picture judging portion 70 judges whether or not the display data input through the personal computer interfaces 11, 12 is for a still picture or a moving picture. If the data is one for a still picture, it is transmitted to the data separator 14, and the above-described processing is executed thereafter. On the other hand, if the data is one for a moving picture, it is directly transmitted to the memory 15 for color display, and it is displayed on the liquid-crystal panel 3a for color display. As a method of judging whether display data is for a still picture or a moving picture, (1) a method of judging by seeing the form of a series of data (e.g., identifiers of a data file or a comment at the head of data), (2) a method of judging that data is for a moving picture when the difference between continuous screens is large, etc. are applicable.

According to this structure, since a data separation process is dispensed with in the case of a moving picture, a high-speed display of a moving picture is possible.

(i) Display control when only a monochrome picture is displayed

When display data includes no data for the color region or no color component and it is only monochrome data, it is possible to project a brighter picture on the screen.

Figure 13:
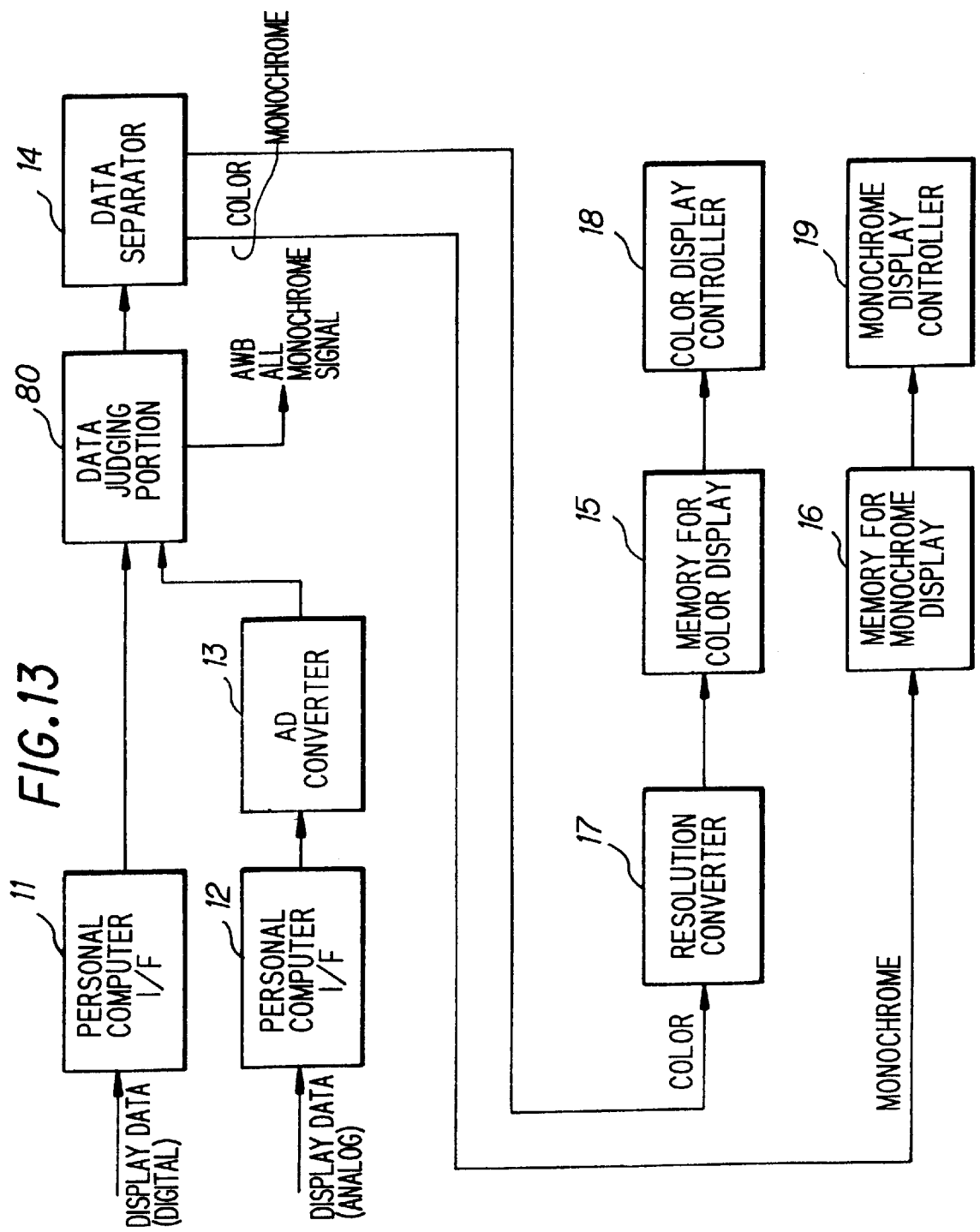
FIG. 13 is an explanatory view of display control for displaying a monochrome picture brightly when there is no color picture.
Figure 14:
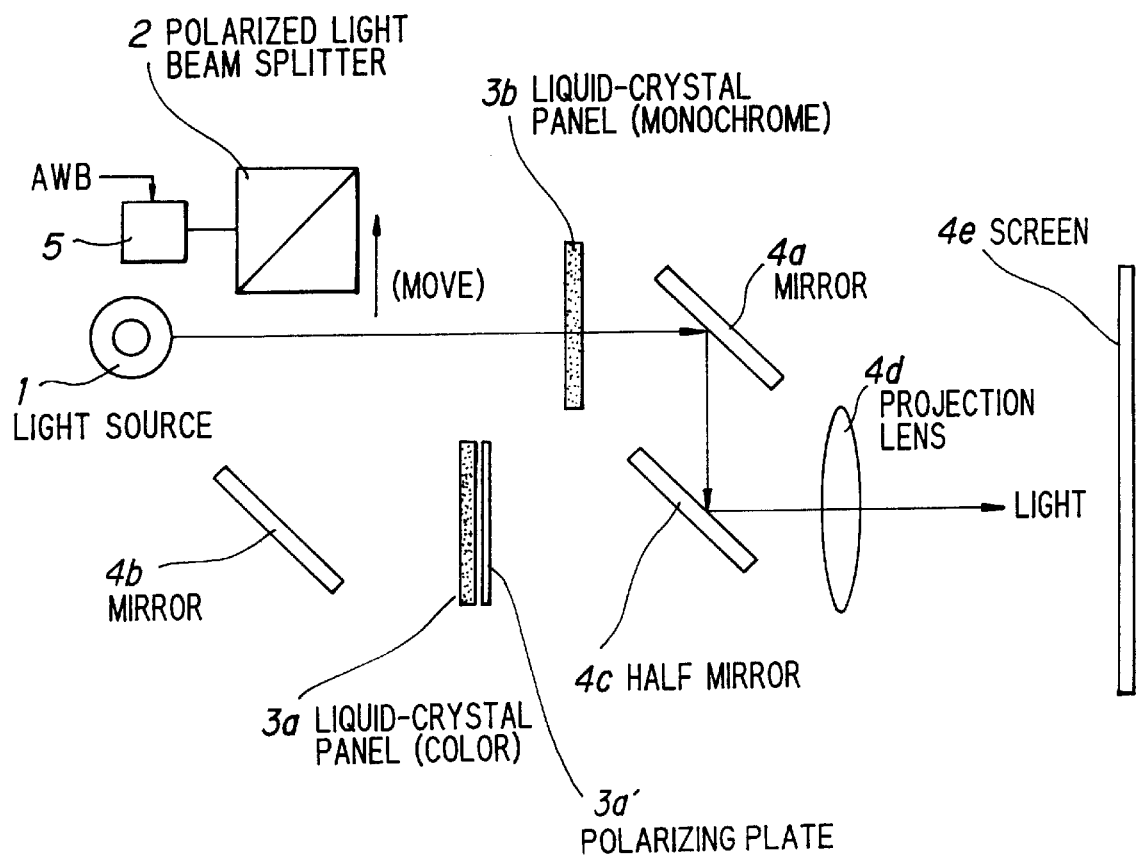
FIG. 14 is an explanatory view of an optical system for displaying a monochrome picture brightly when there is no color picture.
Figure 15A:
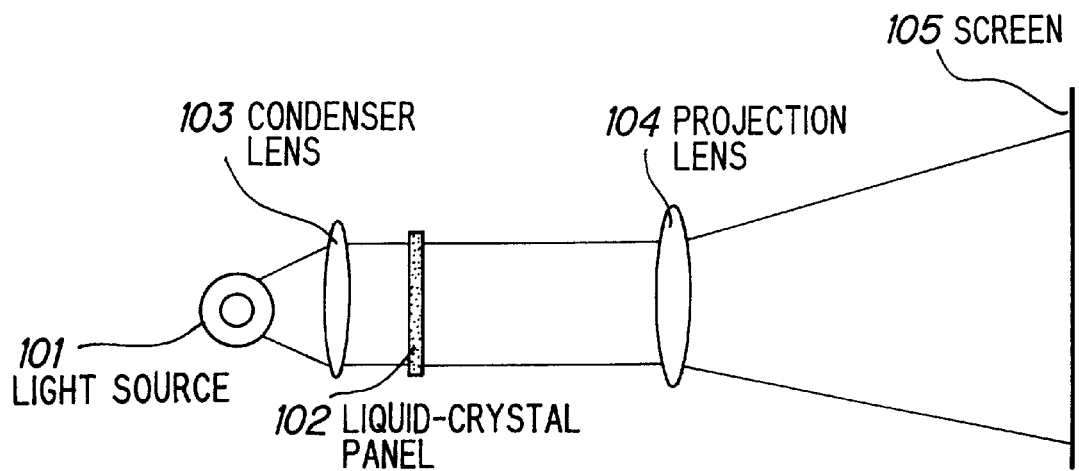
FIGS. 15A and 15B are explanatory views of the optical systems of a single-panel projector and a three-panel projector, respectively.
Figure 15B:
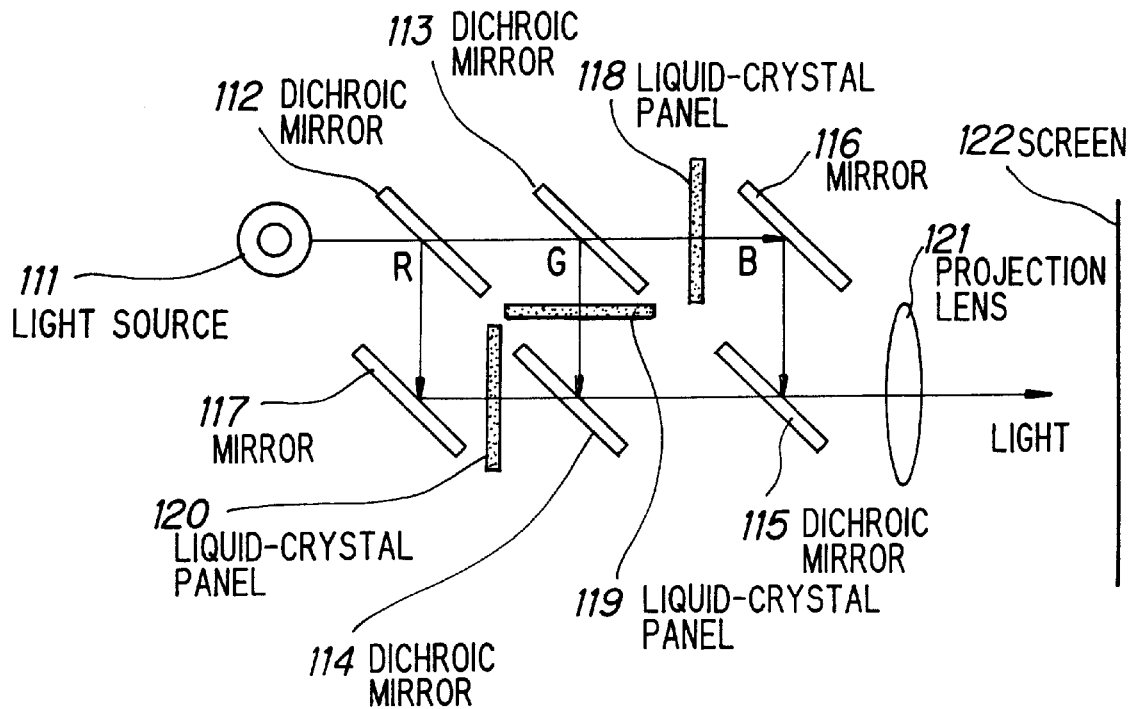

FIG. 13 shows the structure of display control when display data is only monochrome data, and FIG. 14 shows the optical system used therefor. In FIGS. 13 and 14, the same reference numerals are provided for the elements which are the same as those shown in FIGS. 2 and 3, respectively. The structure of display control shown in FIG. 13 is different from that shown in FIG. 2 in that a data judging portion 80 for judging whether or not display data is only (or approximately only) monochrome data is provided. The optical system shown in FIG. 14 is different from that shown in FIG. 3 in that a moving mechanism 5 for moving the polarized light beam splitter 2 is provided.

The data judging portion 80 inputs an all monochrome signal AWB to the moving mechanism 5 (FIG. 14) when display data is judged to include no data for the color region or no color component. The moving mechanism 5 then moves the polarized light beam splitter 2 from the optical path.

As a method of judging whether or not display data is only monochrome data, the above-described monochrome region/color region judging method is applicable. Further, a method of judging display data to be data for the monochrome region when the values of the color difference data Cr, Cb are 0 (0 is assumed to be achromatic color) or very small (for example, not more than 20 on the assumption that the maximum value is 255) are applicable. The polarized light beam splitter 2 is moved by utilizing a linear motor or the like.

As explained above, if a phase transfer liquid-crystal panel is used as the liquid-crystal panel, since it is possible to utilize the liquid-crystal without any influence of polarization, it is possible to project a brighter picture on the screen.

Although the present invention is applied to a projector in the above explanation, it goes without saying that the present invention is not limited to a projector but is applicable to other display apparatuses.

As described above, according to the present invention, since a display apparatus is composed of: an optical device for separating the light from a light source for projection into two polarized light beams; a first liquid-crystal panel (e.g., TN liquid-crystal panel) which is capable of displaying a color picture and a moving picture but which has not a large number of pixels; a second liquid-crystal panel (e.g., phase transfer liquid-crystal panel) which does not utilize polarized light, displays monochrome picture and has a large number of pixels; and an optical system for synthesizing the pictures formed on the first and second liquid-crystal panels and projecting the synthesized picture on a screen, it is possible to display a color moving picture or a color still picture with a color gradation and a monochrome still picture or a monochrome document with a high resolution and, in addition, to produce a bright picture.

According to the present invention, since a data separating means separates display data into first data (color component data or display data for the color region) for the liquid-crystal panel for color display and second data (brightness data or display data for the monochrome region) for the liquid-crystal panel for monochrome display, the color picture is displayed on the liquid-crystal panel for color display in color in accordance with the first data and the monochrome picture is displayed on the liquid-crystal panel for monochrome display in monochrome in accordance with the second data, these color and monochrome pictures are synthesized and the synthesized picture is projected onto a screen, it is possible to display a desired color picture with a color gradation and a monochrome picture with a high resolution, respectively.

According to the present invention, since the number of display data for each liquid-crystal panel is converted into the number of pixels of the corresponding liquid-crystal panel, it is possible to display each picture with the resolution of each corresponding liquid-crystal panel and it is possible to synthesize the pictures in the same size and to project the synthesized picture on a screen.

According to the present invention, a digital interface means and an analog interface means are provided as means for receiving display data, it is possible to receive both digital display data and analog display data and display a color moving picture or a color still picture with a color gradation and a monochrome still picture or a monochrome document with a high resolution.

According to the present invention, when display data is supplied in an RGB form for each pixel, the data separator detects the minimum value of the R, G and B levels for each pixel, subtracts the minimum value from each of the R, G and B levels, and outputs the results obtained by subtraction as color components, while converting the lowest level into a binary value and outputting it as a brightness component, it is possible to separate the data into color components and a brightness component by a simple structure.

According to the present invention, when display data is supplied in an RGB form for each pixel, the data separator detects the minimum value and the maximum value of the R, G and B levels for each pixel, calculates the difference between the maximum value and the minimum value for each pixel, compares the difference with a preset value, judges whether the pixel is one for the color region or the monochrome region on the basis of the result of the comparison, and outputs the display data separated into one for the color region and one for the monochrome region, it is possible to separate the data into one for the color region and one for the monochrome region by a simple structure.

According to the present invention, a light quantity adjusting means is provided on the optical path on the liquid-crystal panel which is capable of bright monochrome display, and the brightness of a monochrome picture is adjusted so as to be the same as the brightness of a color picture by the light quantity adjusting means, the synthetic picture becomes easy to see.

According to the present invention, since a means for detecting whether display data is still picture data or moving picture data, and when it is data for a moving picture, all the display data is transmitted to the liquid-crystal panel for color display without being separated, the data separation process is dispensed with, so that high-speed display and, hence, the display of a moving picture is enabled.

According to the present invention, a means for judging whether or not display data for one screen is approximately monochrome data is provided, and if the answer is yes, the liquid-crystal panel (TN liquid-crystal panel) for color display is removed from the optical path. Therefore, if a phase transfer liquid-crystal panel is used as the liquid-crystal panel for monochrome display, it is possible to utilize the liquid-crystal without any influence of polarization, so that it is possible to project a brighter picture on the screen.

According to the present invention, a display apparatus is composed of: a high-definition monochrome liquid-crystal panel; a color liquid-crystal panel which is capable of high-speed operation; a data separator for separating video data into data for the monochrome liquid-crystal panel and data for the color liquid-crystal panel; a first display controller for displaying a monochrome picture on the monochrome liquid-crystal panel in accordance with the data for the monochrome liquid-crystal panel; a second display controller for displaying a color picture on the color liquid-crystal panel in accordance with the data for the color liquid-crystal panel; and an optical system for synthesizing the pictures on both liquid-crystal panels and projecting the synthesized picture on a screen, it is possible to display a color moving picture or a color still picture with a color gradation and it is possible to display a monochrome still picture or a monochrome document with a high resolution and, in addition, to produce a bright picture.

As many apparently widely different embodiments of the present invention can be made without departing from the spirit and scope thereof, it is to be understood that the invention is not limited to the specific embodiments thereof except as defined in the appended claims.

What is claimed is:

1. A display apparatus using a plurality of liquid-crystal panels comprising:

an optical device for separating the light from a light source for projection into two polarized light beams;

a first liquid-crystal panel which includes a polarizing plate and to which a first polarized light beam separated by said optical device is input;

a second liquid-crystal panel which has no polarizing plate and to which a second polarized light beam separated by said optical device is input; and an optical system for synthesizing the pictures on said first and second liquid-crystal panels and displaying the synthesized picture on a screen.

2. A display apparatus according to claim 1, further comprising:

a data separating means for separating display data into data for said first liquid-crystal panel and data for said second liquid-crystal panel;

a first liquid-crystal panel display controller for controlling the color display of said first liquid-crystal panel in accordance with the separated data for said first liquid-crystal panel; and a second liquid-crystal panel display controller for controlling the monochrome display of said second liquid-crystal panel in accordance with the separated data for said second liquid-crystal panel.

3. A display apparatus according to claim 2, wherein said data separating means includes a means for separating said display data into color component data and brightness component data;

said first liquid-crystal panel display controller controls said first liquid-crystal panel so as to display a color picture on the basis of said color component data; and said second liquid-crystal panel display controller controls said second liquid-crystal panel so as to display a monochrome picture on the basis of said brightness component data.

4. A display apparatus according to claim 2, wherein said data separating means includes a means for separating said display data into display data for a color region and display data for a monochrome region;

said first liquid-crystal panel display controller controls said first liquid-crystal panel so as to display a color picture on the basis of said display data for said color region; and said second liquid-crystal panel display controller controls said second liquid-crystal panel so as to display a monochrome picture on the basis of said display data for said monochrome region.

5. A display apparatus according to claim 2, further comprising: a means for converting the number of either of said data for said first liquid-crystal panel and said data for said second liquid-crystal panel into the number of pixels per screen of the corresponding liquid-crystal panel.

6. A display apparatus according to claim 3, wherein, when said display data is supplied in an RGB form for each pixel, said means for separating said display data into color component data and brightness component data includes;

a means for detecting the lowest level of the R, G and B levels for each pixel;

a means for subtracting the minimum value from each of said R, G and B levels, and outputting the results as said color component data of the corresponding pixel; and a means for outputting said lowest level as a brightness component of said corresponding pixel.

7. A display apparatus according to claim 4, wherein, when said display data is supplied in an RGB form for each pixel, said means for separating said display data into display data for said color region and display data for said monochrome region includes;

a means for detecting the minimum value and the maximum value of the R, G and B levels for each pixel;

a means for calculating the difference between said maximum value and said minimum value;

a means for comparing said difference with a preset value; and a means for judging whether the corresponding pixel is one for said color region or one for said monochrome region on the basis of the result of the comparison, and separating said display data into display data for said color region and display data for said monochrome region.

8. A display apparatus according to claim 2, further comprising a light quantity adjusting means provided on the optical path of said second liquid-crystal panel which has no polarizing plate.

9. A display apparatus according to claim 2, further comprising a means for judging whether said display data is still picture data or moving picture data and transmitting all of said display data to said first liquid-crystal panel if said display data is moving picture data.

10. A display apparatus according to claim 3, further comprising a means for judging whether or not said display data for all pixels of one screen are monochrome data and removing said first liquid-crystal panel from said optical path if the answer is in the affirmative.

11. A display apparatus using a plurality liquid-crystal panels comprising:

a high-definition monochrome liquid-crystal panel;

a color liquid-crystal panel which is capable of high-speed operation;

a data separator for separating video data into data for said monochrome liquid-crystal panel and data for said color liquid-crystal panel;

a first display controller for displaying a monochrome picture on said monochrome liquid-crystal panel in accordance with said data for said monochrome liquid-crystal panel;

a second display controller for displaying a color picture on said color liquid-crystal panel in accordance with said data for said color liquid-crystal panel; and an optical system for synthesizing the pictures on both of said liquid-crystal panels and displaying the synthesized picture on a screen.

12. A display apparatus using a plurality liquid-crystal panels comprising:

a high-definition liquid-crystal panel;

a high-speed liquid-crystal panel which is capable of high-speed operation;

a data separator for separating video data into a first data for said high-definition liquid-crystal panel and a second data for said high-speed color liquid-crystal panel;

a first display controller for displaying a picture on said high-definitino liquid-crystal panel in accordance with said first data;

a second display controller for displaying a color picture on said high-speed liquid-crystal panel in accordance with said second data; and an optical system for synthesizing the pictures on both of said liquid-crystal panels and displaying the synthesized picture on a screen.

13. A display apparatus according to claim 12, wherein said first data is character or line and said second data is image.

* * * * *